United States Patent [19]
Tu et al.

[11] Patent Number: 5,682,403
[45] Date of Patent: Oct. 28, 1997

[54] SPREAD SPECTRUM COMMUNICATION NETWORK SIGNAL PROCESSOR

[75] Inventors: Jerome C. Tu, San Jose; Gregory James Gerst, Palo Alto, both of Calif.

[73] Assignee: Wavelink Communications, Hamilton, Bermuda

[21] Appl. No.: 434,554

[22] Filed: May 4, 1995

[51] Int. Cl.$^6$ .................................................. H04B 15/00
[52] U.S. Cl. ........................ 375/200; 455/33.1; 455/54.1
[58] Field of Search ...................... 375/200; 455/33.1, 455/54.1, 49.1; 379/58

[56] References Cited

U.S. PATENT DOCUMENTS

| | | |
|---|---|---|
| 4,144,409 | 3/1979 | Utano et al. |
| 4,777,633 | 10/1988 | Fletcher . |
| 4,785,450 | 11/1988 | Bolgiano et al. |
| 4,825,448 | 4/1989 | Critchlow et al. |
| 5,212,804 | 5/1993 | Choate ........................... 455/33.1 |
| 5,287,384 | 2/1994 | Avery et al. |
| 5,303,234 | 4/1994 | Kou ................................. 370/85.2 |
| 5,335,356 | 8/1994 | Andersson ..................... 455/54.1 |
| 5,357,513 | 10/1994 | Kay et al. ....................... 370/95.3 |
| 5,420,911 | 5/1995 | Dahlin et al. ................... 379/59 |
| 5,430,789 | 7/1995 | Ohgami ........................... 379/58 |
| 5,517,690 | 5/1996 | Linquist et al. ................. 455/33.1 |
| 5,528,593 | 6/1996 | English et al. .................. 370/84 |
| 5,541,979 | 7/1996 | Leslie et al. ..................... 379/60 |
| 5,551,057 | 8/1996 | Mitra .............................. 455/33.1 |

FOREIGN PATENT DOCUMENTS

| | | | |
|---|---|---|---|
| 0 439 926 A3 | 12/1990 | European Pat. Off. | H04Q 7/04 |
| 0 497 083 A1 | 12/1991 | European Pat. Off. | H04Q 7/04 |
| 0 590 412 A1 | 9/1993 | European Pat. Off. | H04L 12/40 |

*Primary Examiner*—Stephen Chin
*Assistant Examiner*—Mohammad Ghayou
*Attorney, Agent, or Firm*—Flehr Hohbach Test Albritton & Herbert LLP

[57] ABSTRACT

A base station communicates with a plurality of mobile stations over a cellular network. In one embodiment, the base station includes a receiver configured to receive inbound information from the mobile station and a transmitter configured to transmit outbound information to the mobile station. The base station further has a central processor that includes a signal processor array. The signal processor architecture is designed to increase the throughput and task-based allocation of processing resources. The signal processing array has both series and parallel signal processing elements. A plurality of signal processor elements are disposed in series to form a signal processing string. A plurality of signal processing strings are disposed in parallel. Each of the signal processor strings includes at least two signal processor elements that are each dedicated to performing a specific task. As a result, the parallel processor strings simultaneously process information corresponding to predetermined criteria, such as TDMA time slots, while the series processors sequentially process that information by an efficient task-based pipeline processing. A preferred protocol is Global Systems for Mobile Communication (GSM).

10 Claims, 13 Drawing Sheets

| # | MS TRANSMIT | MS RECEIVE |
|---|---|---|
| 0 | m0 | m0+45MHz |
| 1 | m1 | m1+45MHz |
| 2 | m2 | m2+45MHz |
| 3 | m3 | m3+45MHz |
| ⋮ | ⋮ | ⋮ |
| N−1 | mN−1 | mN−1+45MHz |

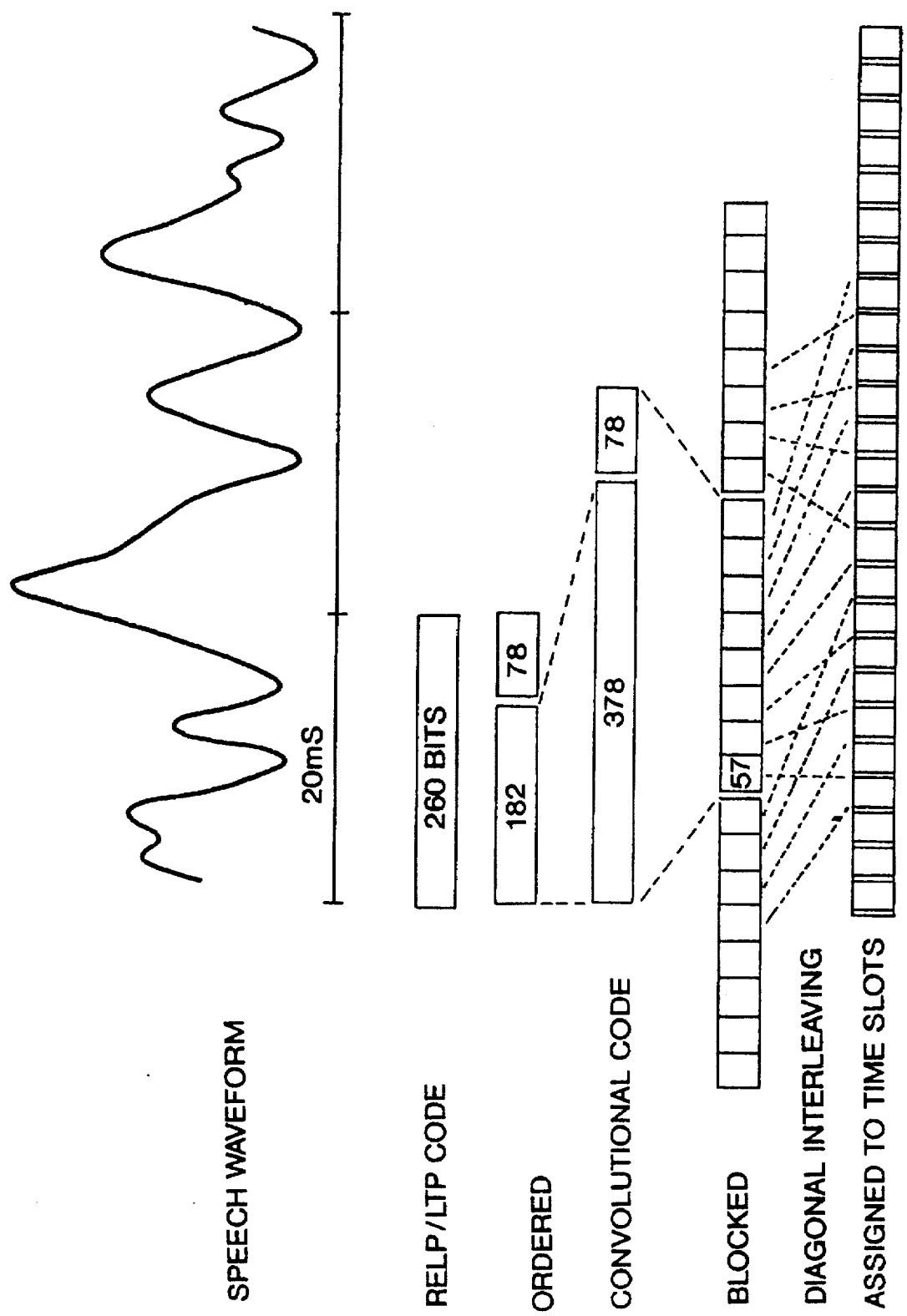

SPREAD SPECTRUM COMMUNICATION NETWORK SIGNAL PROCESSOR

RELATED APPLICATIONS

The present application incorporates the following patent applications by reference: U.S. Ser. No. 08/435,709, filed on May 4, 1995; U.S. Ser. No. 08/435,838, filed on May 4, 1995; U.S. Ser. No. 08/434,597, filed May 4, 1995; and U.S. Ser. No. 08/434,598, filed on May 4, 1995.

FIELD

The present invention relates to a spread spectrum communication network signal processor. In particular, the present invention is used in a cellular communication network to improve the information channel capacity with a distributed signal processing architecture.

BACKGROUND

Spread spectrum communication typically includes two type of techniques: direct sequence spread spectrum (DSSS), where the information signal in-phase and quadrature-phase are varied; and frequency hopping spread spectrum (FHSS), where the information carrier frequency is varied. Moreover, these techniques can include formats for what is known as time division multiple access (TDMA) and frequency division multiple access (FDMA). These formats dedicate a specific periodic time slot or frequency to each mobile station. Advantages of DSSS, FHSS, TDMA and FDMA include reduced co-channel interference and improved information channel capacity over a given bandwidth. While these techniques can be employed independently, they can also be combined.

One limitation of existing communication networks is that the base station must have a multiplicity of dedicated transmitters and receivers to adequately process all the mobile station signals. Since each base station transmitter and receiver can communicate only one frequency, a large number of transmitters and receivers are required to serve the communication network employing multiple frequencies. For example, eight transmitters and eight receivers are required to serve eight receive frequencies and eight transmit frequencies.

Moreover, since existing communication networks use a multiplicity of dedicated transmitters and receivers, a fault can cause data to be lost, or even cause the network to malfunction. When a transmitter or receiver is broken, the network must operate in a reduced capacity, if it can operate at all.

Another limitation of existing communication networks is that the FHSS protocol sequence is predetermined. That is, the frequency hops are periodic within the same frequency set. This results in continual interference from other operating electro-magnetic fields. The existing communication protocols do not adapt to avoid interference.

Another limitation of existing communication networks is that the processing is performed within a central signal processor. A central signal processor employs software to perform the procedures necessary to process the data. While this configuration provides high flexibility, it is also slow and requires high computational and memory overhead.

Another limitation of existing communication networks is that in the communication protocol, the specific periodic TDMA time slot is fixed. Each mobile station is entitled to a single slot and may not receive an additional slot even if other mobile stations are not fully utilizing their respective information channel capacity.

SUMMARY

The present invention relates to a spread spectrum communication network signal processor. In particular, the present invention is used in a cellular communication network to improve the information channel capacity with a distributed signal processing architecture. Exemplary embodiments are provided for use with the Global Systems for Mobile Communication (GSM) protocol.

A base station communicates with a plurality of mobile stations over a cellular network. In one embodiment, the base station includes a receiver configured to receive inbound information from the mobile station and a transmitter configured to transmit outbound information to the mobile station.

The base station further has a central processor that includes a signal processor array. The signal processor architecture is designed to increase the throughput and task-based allocation of processing resources. The signal processing array has both series and parallel signal processing elements. A plurality of signal processor elements are disposed in series to form a signal processing string. A plurality of signal processing strings are disposed in parallel. Each of the signal processor strings includes at least two signal processor elements that are each dedicated to performing a specific task. As a result, the parallel processor strings simultaneously process information corresponding to predetermined criteria, such as TDMA time slots, while the series processors sequentially process that information by an efficient task-based pipeline processing.

Once the inbound information is processed by the signal processor array, the inbound information is sent to the central processor. The central processor is responsible for communicating information with a public switched telephone network.

The base station further receives outbound information from the public switched telephone network and sends the outbound information to the signal processor array to encode the information and send it to a transmitter to be delivered to the mobile station. The outbound signal processing is similar to the inbound signal processing, only in reverse.

In another embodiment, the base station further includes a plurality of receivers and transmitters (transceivers) where each transceiver has a dedicated signal processor array. This architecture promotes front end distributed processing and relieves the processing load on the central processor.

The advantages of the present invention include reduced interference, improved communication bandwidth, fault tolerance, modularity, scalability, and more efficient and cost-effective base stations and mobile stations.

BRIEF DESCRIPTION OF THE DRAWINGS

Additional advantages of the invention will become apparent upon reading the following detailed description and upon reference to the drawings, in which:

FIG. 3 illustrates a speech waveform sampled and assembled into a digital GSM format;

DETAILED DESCRIPTION

The present invention relates to a spread spectrum communication network signal processor. In particular, the present invention is used in a cellular communication network to improve the information channel capacity with a distributed signal processing architecture. Exemplary embodiments are provided for use with the Global Systems for Mobile Communication (GSM) communication protocol.

The exemplary embodiments are described herein with reference to specific configurations and protocols. Those skilled in the art will appreciate that various changes and modifications can be made to the exemplary embodiments while remaining within the scope of the present invention.

Figure 1:
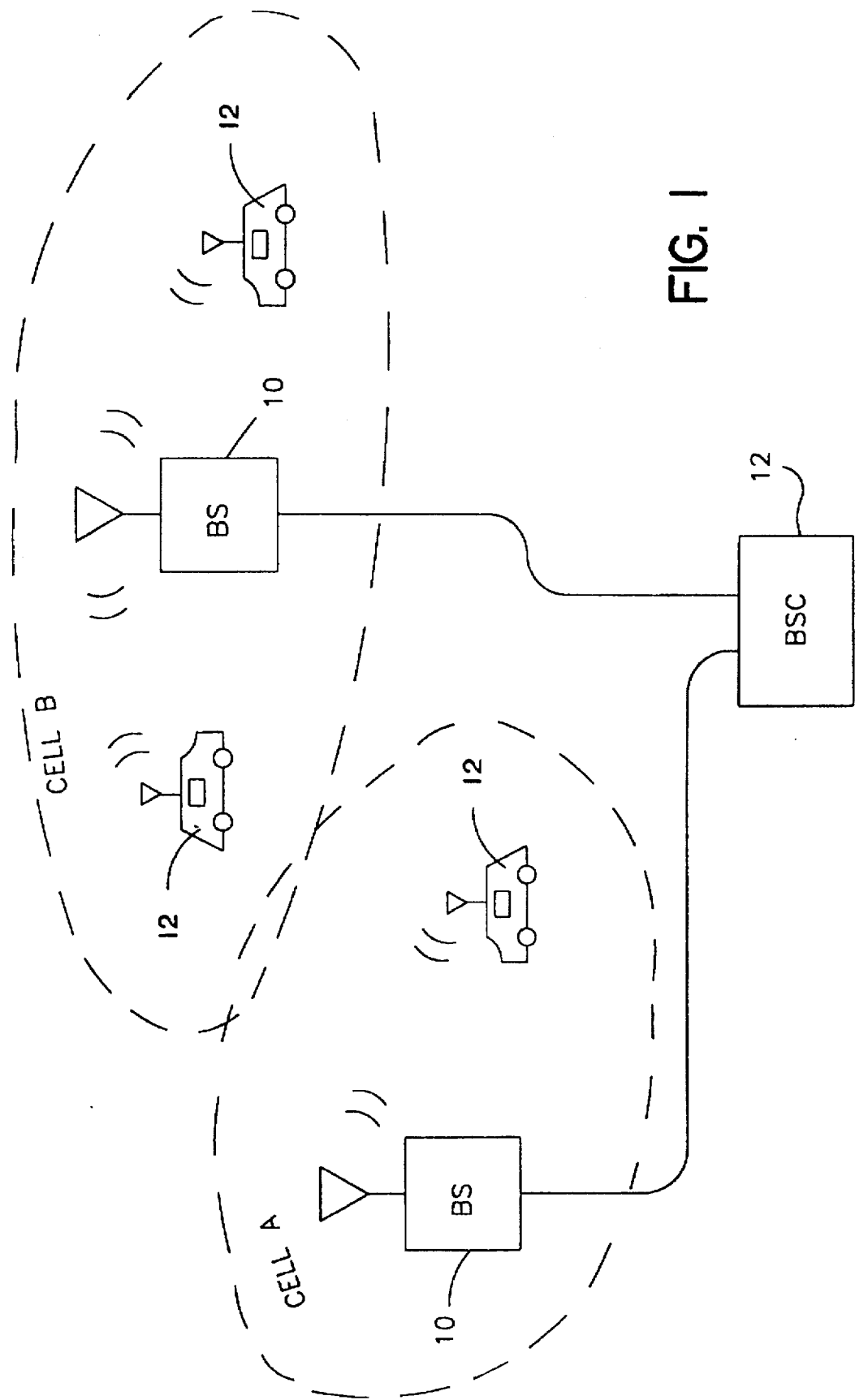
FIG. 1 depicts a cellular network showing several base stations and several mobile stations.

A first embodiment is described with reference to FIGS. 1 through 6. FIG. 1 is a relatively general illustration of a cellular communication network. A number of base stations (BS) 10 are positioned to serve a number of geographically distinct cells, for example cell A and cell B. Each base station 10 is responsible for serving all the mobile stations (MS) 12 within its respective cell boundary. To perform this task, each base station 10 downloads a frequency hopping table (also known as a mobile allocation table) to each mobile station 12 so that the communication between base station 10 and mobile station 12 is on predefined frequencies, as explained more fully below.

A base station controller (BSC) 14 is coupled to every base station 10, typically via land line 92, and controls the communication between users, such as between mobile station users or existing infrastructure telephone users. Moveover, base station controller 14 controls the hand-off from one base station 10 to another base station 10 as a mobile station 12 moves among cells.

A protocol selected for the embodiments is the Global Systems for Mobile Communication (GSM) protocol. The GSM protocol is lengthy and complicated. Therefore, the salient features are discussed with respect to the embodiments. For additional information on the subject, the reader is referred to the GSM specification. One important GSM protocol requirement is frequency hopping spread spectrum (FHSS). That is, sequentially communicating over more than one frequency.

Figures 2A, 2B:
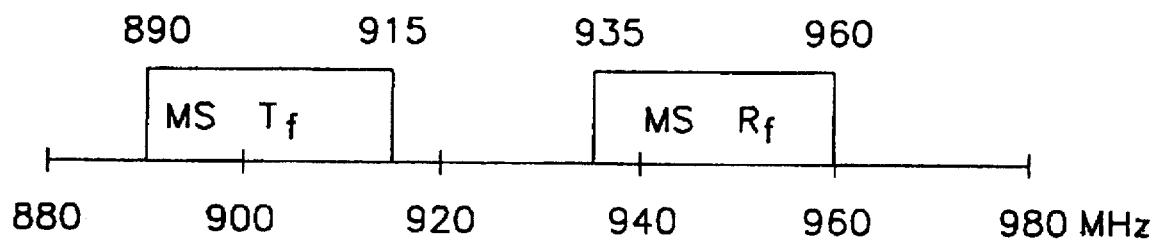
FIGS. 2A–C illustrate the frequency bands allocated to GSM communication, a typical frequency hopping table, and the GSM frequency hopping algorithm.
Figure 2C:
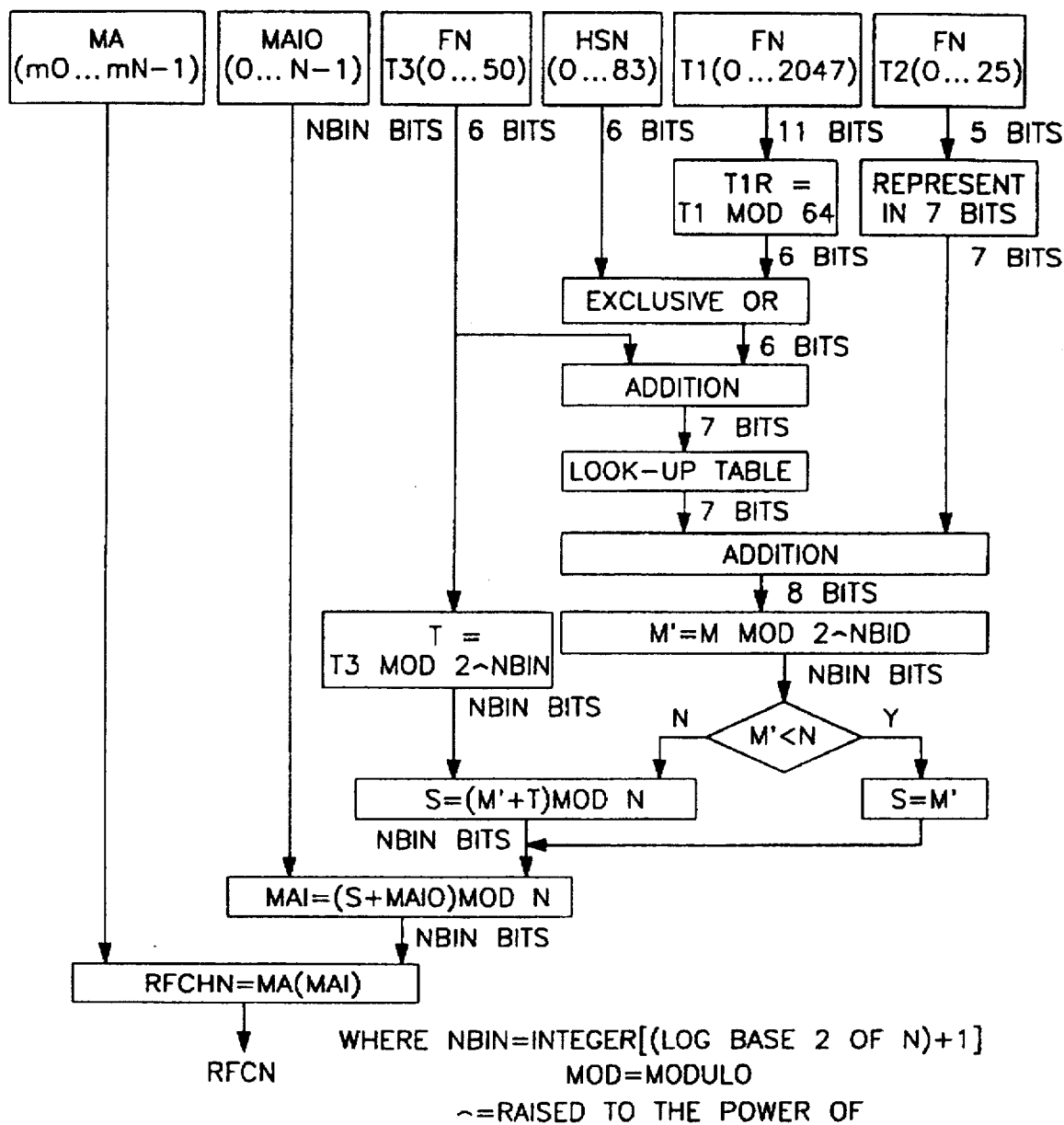

FIG. 2A shows the allocated frequency spectrum for GSM communication (from the mobile station standpoint). As can be seen, the mobile station transmit frequency band $(T_f)$ is disjoint from the mobile station receive frequency band $(R_f)$. Each of these frequency bands occupies approximately 25 MHz. Within that 25 MHz, there are 124 200 KHz frequency steps on which the communication frequencies are permitted to hop. An extended GSM specification is currently under development, and will include a broader range of operational frequencies. The specific hopping sequence is a function of the GSM hopping algorithm defined by the GSM specification and a given frequency hopping table that is downloaded from base station 10 to mobile station 12. An example frequency hopping table is presented in FIG. 2B. Based on the GSM hopping algorithm (FIG. 2C), the mobile station receiver and transmitter operate on specified 200 KHz frequencies in their respective frequency bands $T_f$, $R_f$. Of course, the base station $T_f$ and $R_f$ correspond to the mobile station $R_f$ and $T_f$ respectively.

Figure 4:
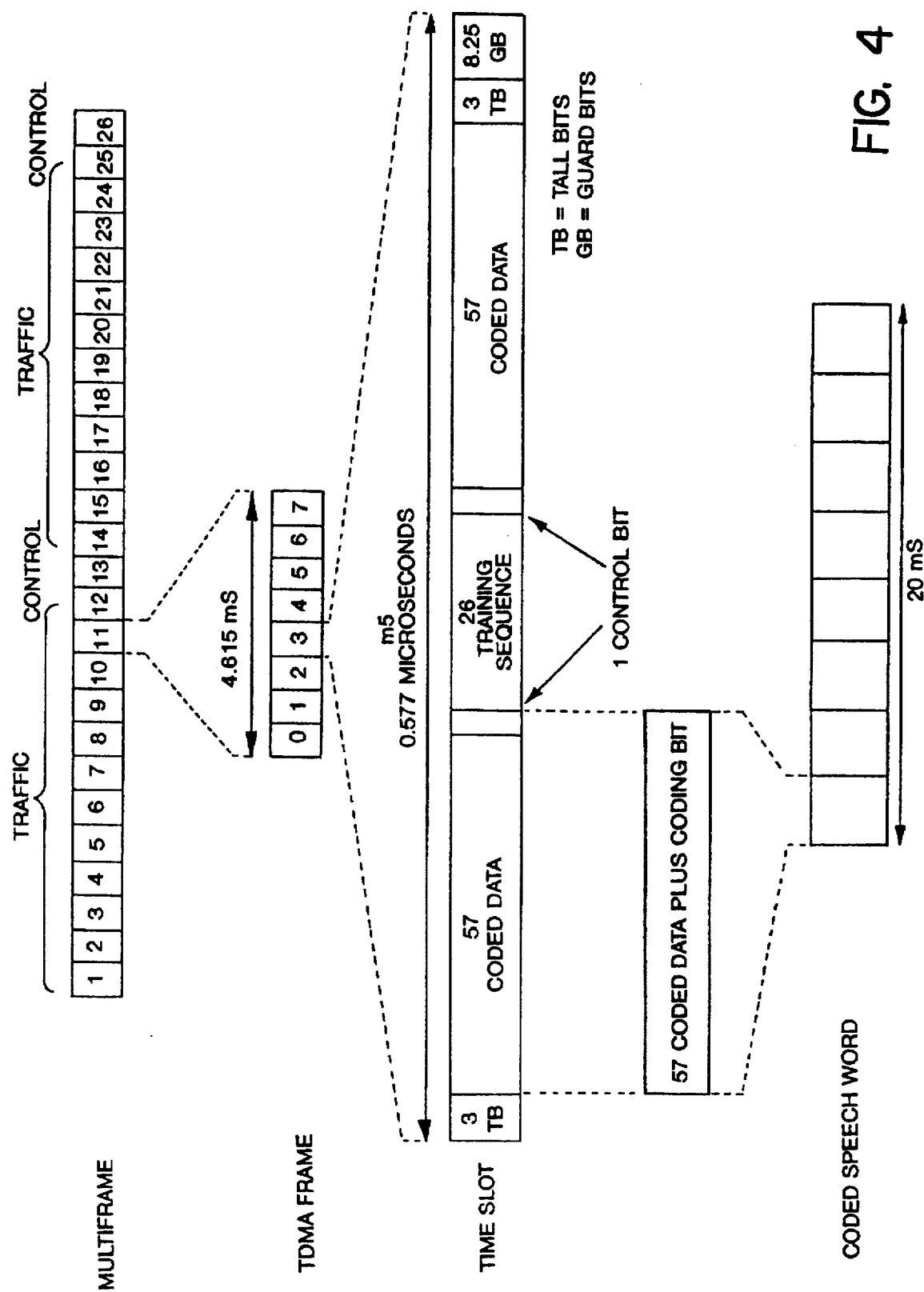
FIG. 4 illustrates a GSM frame and associated data.

Since GSM is a digital data communication network, FIG. 3 shows how a speech waveform is sampled and digitally encoded. FIG. 4 shows how the encoded data is formatted into the GSM frame structure. Note that the information from one mobile station 12 is processed and placed into a specific time slot reserved for that particular mobile station 12 within a TDMA frame. Further, note that after the TDMA frame is collected, a multiframe is constructed from 26 TDMA frames, including 24 TDMA speech frames and 2 control frames. Beyond the multiframe are superframes and hyperframes. There are 51 multiframes in a superframe, and there are 2048 superframes in a hyperframe. The hyperframe number is one variable used by the GSM frequency hopping algorithm to define the frequency hopping sequence.

Based on the GSM frequency hopping algorithm (FIG. 2C), the TDMA frames are then frequency hopped over the frequencies of the frequency hopping table. The mobile station receivers are also periodically hopped onto a fixed monitor frequency that is unique to each base station. The frequency hopping serves to spread the communication signal over the frequency bands $T_f$, $R_f$. One advantage of spread spectrum is reduced interference effects from other electro-magnetic sources and other base station/mobile station communications. Another advantage is that it the avoidance of frequency-selective nulls due to multipath effects. For the mobile station, three frequencies are tuned onto in one 4.615 ms TDMA time frame (transmit, receive, monitor). Each mobile station transmitter and receiver synthesizer has 1 or 2 time slots (4.615 ms times ⅛ or ⅖, i.e., 0.58 ms or 1.15 ms) to change frequencies. Frequency hopping once per frame is easily accomplished because the synthesizers have plenty of time (1 or 2 time slots) to settle before a new reception or transmission is required. However, the base station receiver and transmitter have only 30 μs to change frequencies (the time duration of the guard bits). This short time period is difficult to accommodate, so the invention incorporates a plurality of receiver synthesizers and transmitter synthesizers as now explained.

Figure 5:
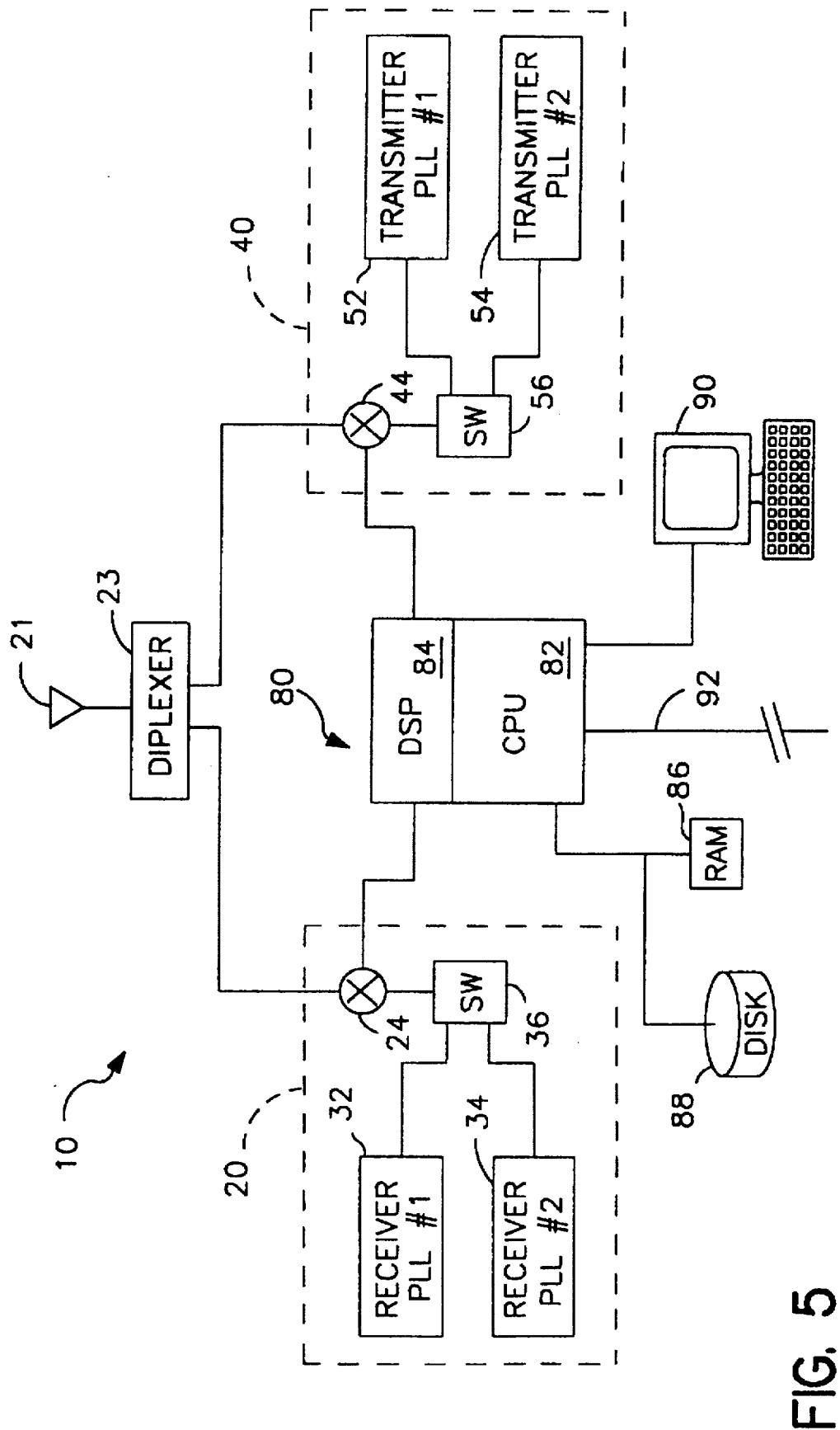
FIG. 5 depicts one embodiment of a base station architecture according to the invention.
Figure 6:
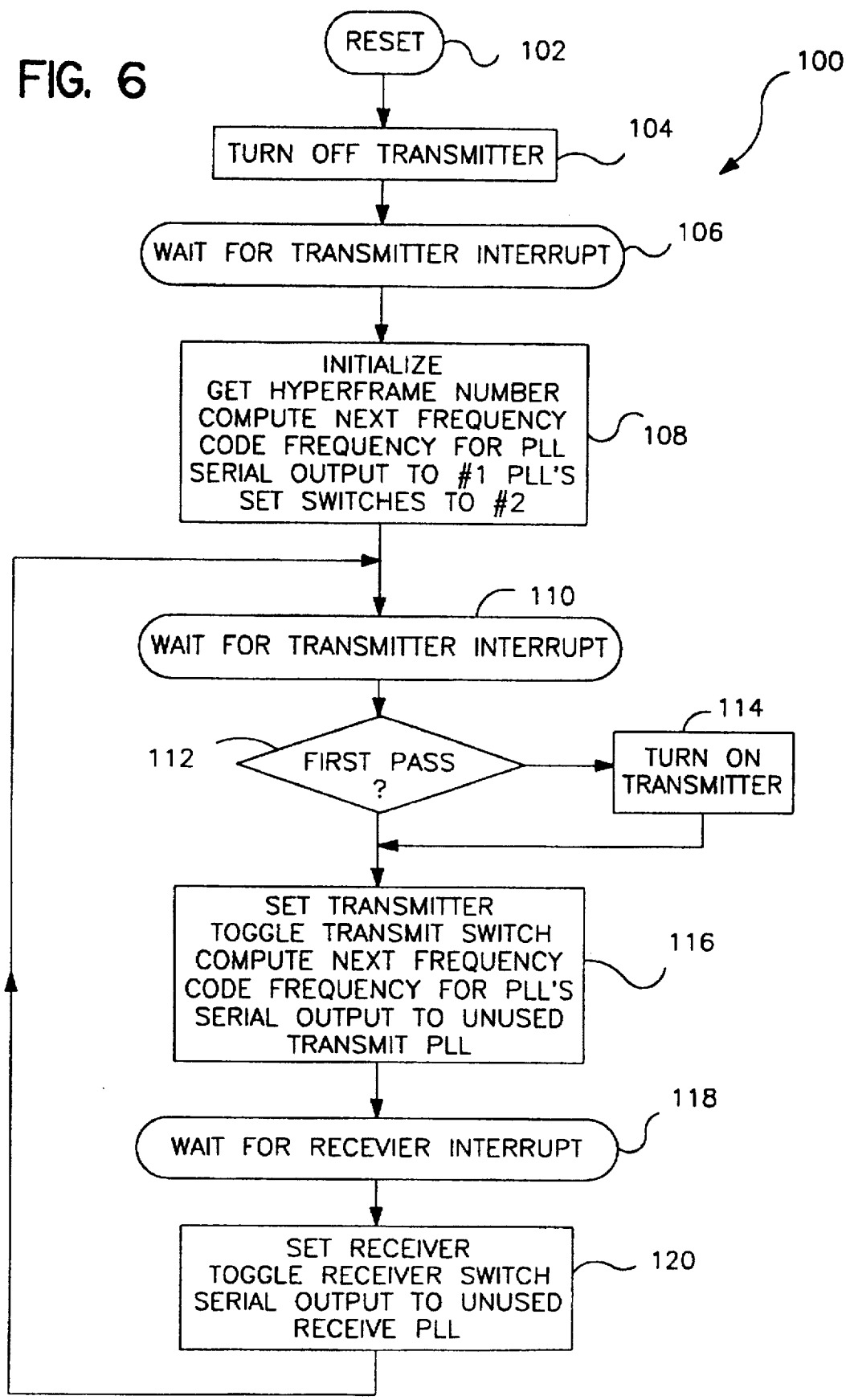
FIG. 6 is a flow chart showing steps performed by the base station of FIG. 5.

FIG. 5 depicts a base station 10 having a receiver 20, a transmitter 40 and a processor 80. As shown, receiver 20 and transmitter 40 share common antenna 21 via diplexer 23. This configuration is possible since the receive frequency and transmit frequency are different (see FIG. 2A). Diplexer 23 is used to permit the receive frequency to pass from antenna 21 to receiver 20, and to permit the transmit frequency to pass from transmitter 40 to antenna 21. Receiver 20 and transmitter 40 each employ two independent synthesizers in order to facilitate fast frequency agility. The detail of the embodiment and the operation is explained with reference to the FIG. 6 flow chart.

The reset step 102 is performed only at start-up, such as when base station 10 initially comes on-line or when recovering from a power failure. Step 104 turns off transmitter 40 to prevent invalid transmission before initialization of the base station 10. Thereafter, step 106 waits for the processor 80 to perform its self-test and other required procedures before base station 10 can become operational in the cellular network. Step 108 calculates the required first frequency and the subsequent second frequency from the GSM hyperframe number and the frequency hopping table. Once these first and second frequencies are calculated, the first and second receiver synthesizers 32, 34, and transmitter synthesizers 52, 54 are programmed to generate the required frequencies. At this point, the switches 36, 56 are set to provide the mixers 24, 44 with the frequencies from the first synthesizers 32, 52 respectively.

A loop sequence begins with step 110, where processor 80 waits for the transmitter interrupt from the CPU 82 to indicate that the TDMA frame should be processed. If the step 112 is being queried for the first time (i.e., transmitter 40 was turned off in step 104), step 114 is performed to turn transmitter 40 on. Once transmitter 40 is on, step 116 proceeds to transmit a TDMA frame and then to toggle the transmitter synthesizer selector switch 56 to the other transmitter synthesizer 54. Step 116 also calculates the next transmitter frequency and programs the previously active synthesizer 52 to generate that frequency.

When the receiver interrupt occurs in step 118, step 120 proceeds to receive a TDMA frame and then to toggle the receiver synthesizer selector switch 36 to the other receiver synthesizer 34. Step 120 also calculates the next receiver frequency and programs the previously active synthesizer 32 to generate that frequency.

Steps 110 through 120 are then repeatedly performed to transmit and receive the TDMA frames to and from the mobile stations 12 on the proper frequencies. This configuration of the dual synthesizer receiver 26 and dual synthesizer transmitter 40 permits base station 10 to faithfully accomplish all the frequency hops required for proper communication.

It is important to note that base station 10 of FIG. 5 employs processor 80 to orchestrate the synthesizers 32, 34, 52, 54 and the synthesizer switches 36, 56. Processor 80 includes a central processing unit (CPU) 82 for performing many of the general procedures required to communicate over the network with mobile station 12. Processor 80 also performs procedures necessary to communicate with base station controller 14. A digital signal processor (DSP) 84 is included in processor 80 to perform many of the application specific and computationally intensive procedures such as encoding and decoding the TDMA frame data. As shown, the processor 80 also includes memory (RAM) 86, and may optionally include bulk disk memory 88. Moreover, user interface 90 is provided to receive instructions from a user and to display requested information. Ground line 92 is also provided to connect to base station controller 14 and other base stations 10 as required by the GSM specification.

Figure 7A:
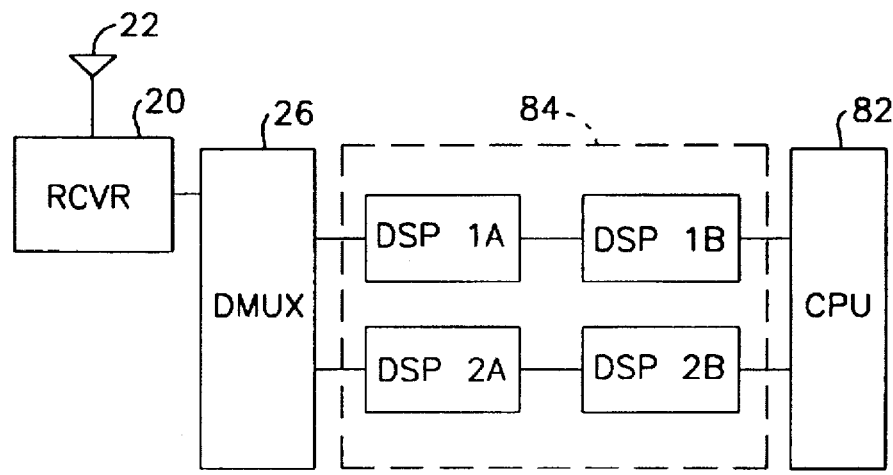
FIGS. 7A–B depict an embodiment of a signal processor architecture according to the invention.
Figure 7B:
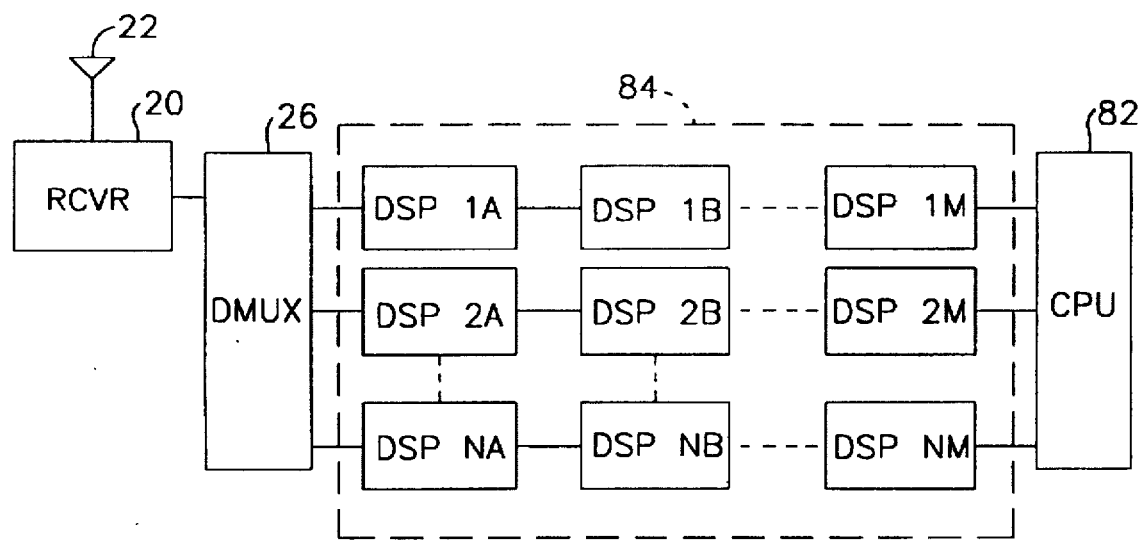
Figure 8:
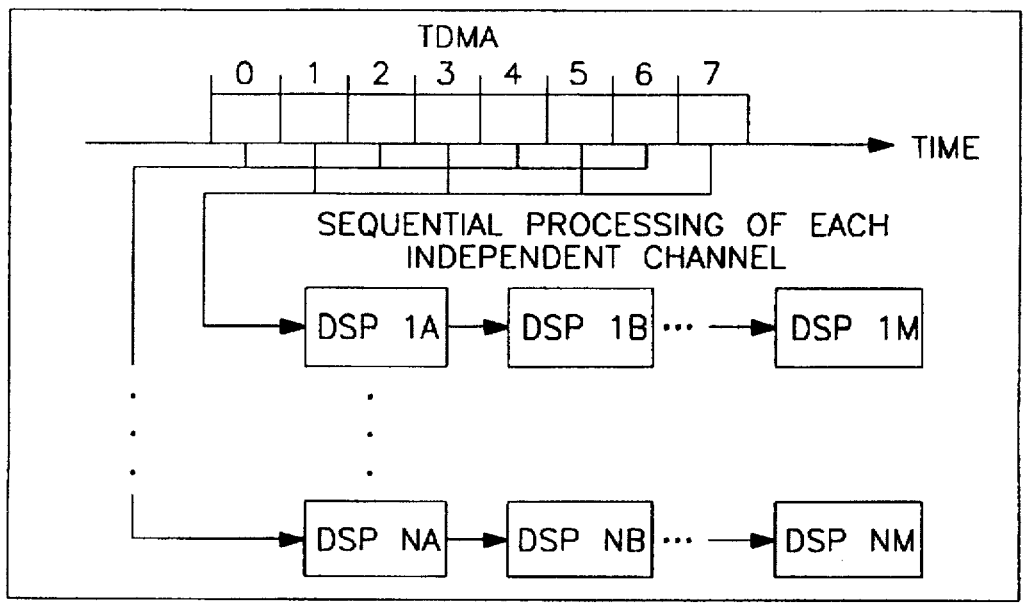
FIG. 8 is a data processing chart showing information demultiplexed to the plurality Of parallel signal processor elements of FIG. 7.
Figure 9:
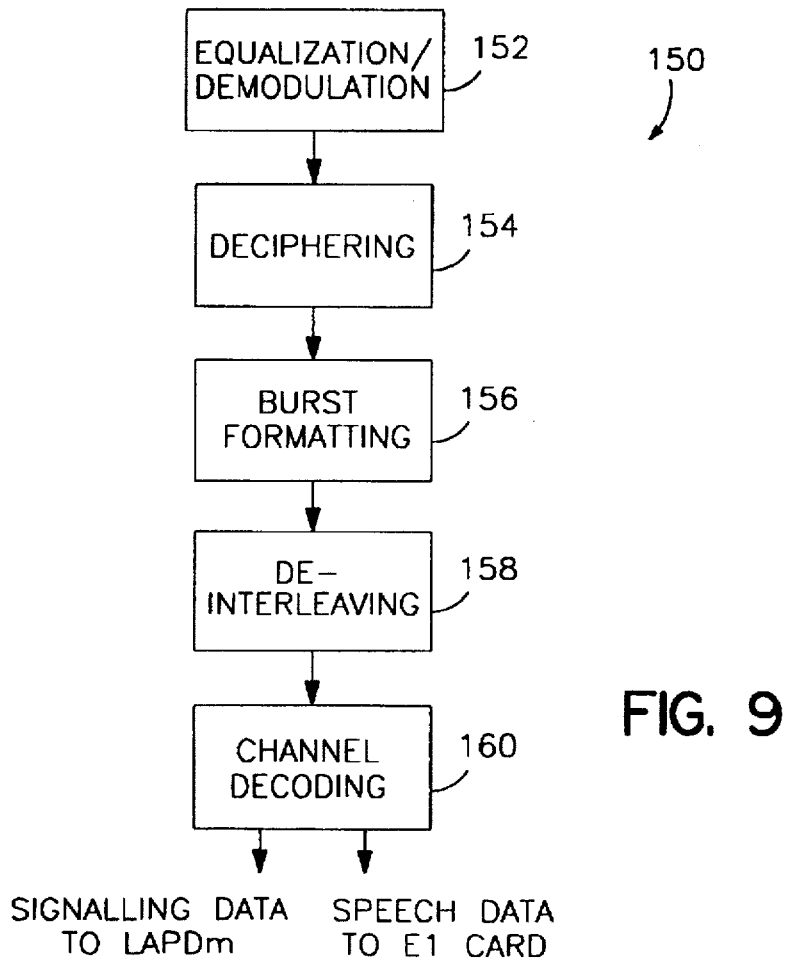
FIG. 9 is a flow chart showing steps performed by the signal processor of FIG. 7.

In another embodiment depicted in FIGS. 7 through 9, the signal processing architecture is provided to increase the throughput and task-based allocation of processing resources. A first aspect of this embodiment is shown in FIG. 7A, where an array of 2 wide and 2 deep DSPs are configured. A second aspect of this embodiment is shown in FIG. 7B, where an N by M array of DSPs are configured. In essence, FIG. 7A is FIG. 7B where N=2 and M=2.

This embodiment shows how an array of signal processors 84 is arranged to process inbound information in parallel and in series. A demultiplexer 26 distributes inbound information to parallel digital signal processors 1A-NA, 2A-NA, 1M-NM that simultaneously process inbound information correlated with each of the TDMA time slots while the series digital signal processors 1A-1M, 2A-2M, NA-NM sequentially process information in each of the respective TDMA time slots in efficient pipeline processing. This procedures is further explained with reference to FIGS. 8 and 9.

The data processing chart of FIG. 8 shows how the inbound information is demultiplexed, by demultiplexer 26, to the plurality of parallel signal processors of FIG. 7. For example, FIG. 8 shows odd time slots distributed to a first processing string 1A-1M, and even time slots distributed to a Nth processing string NA-NM. For an information word of 8 time slots, up to 8 parallel processing strings are used, where each string would be associated with one time slot. One architectural principle is to balance the processing load evenly on all the strings, whether there are as many as 8 strings or a few as 2 strings.

The flow chart of FIG. 9 shows steps performed by string 1 of the signal processor of FIG. 7A to process the inbound information. An equalization step 152 is performed in DSP1A, where the inbound information is processed to compensate for noise, multipath fading, and other propagation related impairments. The equalized information is then deciphered in step 154 to recover the original unenciphered data bits, which is performed in DSP1A. Thereafter, step 156 burst formats the information in order to retrieve the correct data pattern from the mobile station 12. This is performed in DSP1A. Next, step 158 deinterleaves the data to reconstruct the proper data words for each respective mobile station 12. This is performed in DSP1B. Step 160 is performed to decode the data in order to properly detect errors and correct the data for errors when possible. This is performed in DSP1B. Once the inbound information is error corrected, then the information is delivered to central processor 82. The central 82 processor may also further process the information, switch the information to other processors for further processing, communicate the information to an outbound information link (e.g., E1 link), or may use the information to modify its own processing steps.

The same sequential steps shown in FIG. 9 are also performed on a different timeslot in second string DSP2A and DSP2B shown in FIG. 7A. The same sequential steps of FIG. 9 may also be performed in any array size in parallel strings DSPNA-DSPNM shown in FIG. 7B. Moreover, the steps shown in FIG. 9 can be distributed to even more DSPs in a string if M is chosen greater than 2.

Figure 10A:
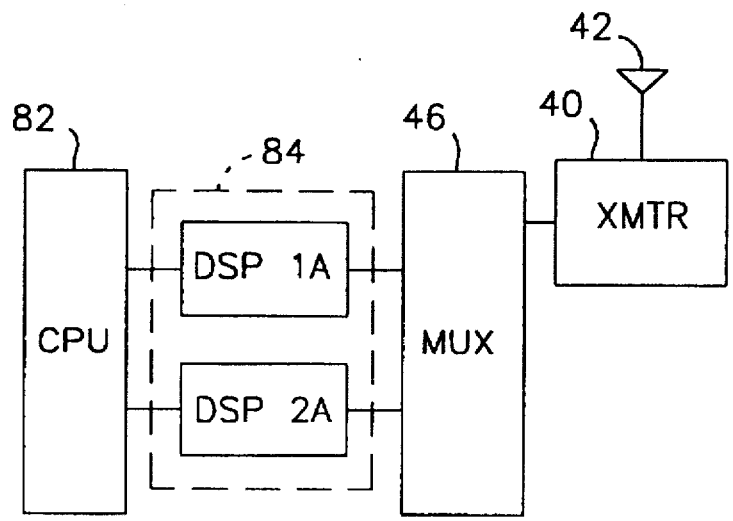
FIGS. 10A–B depict another embodiment of a signal processor architecture according to the invention.
Figure 10B:
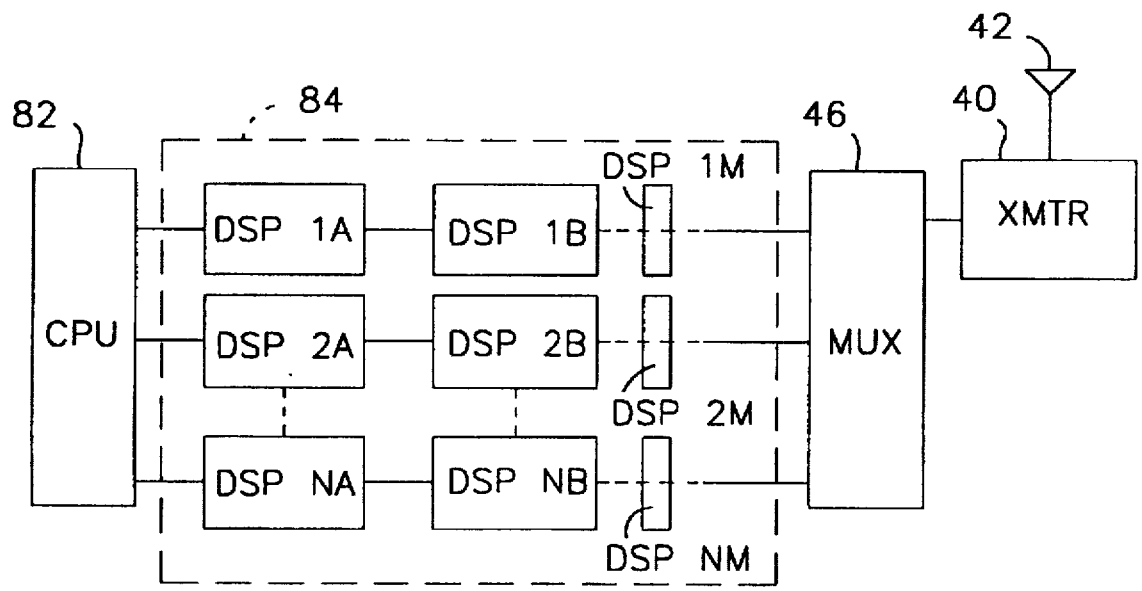
Figure 11:
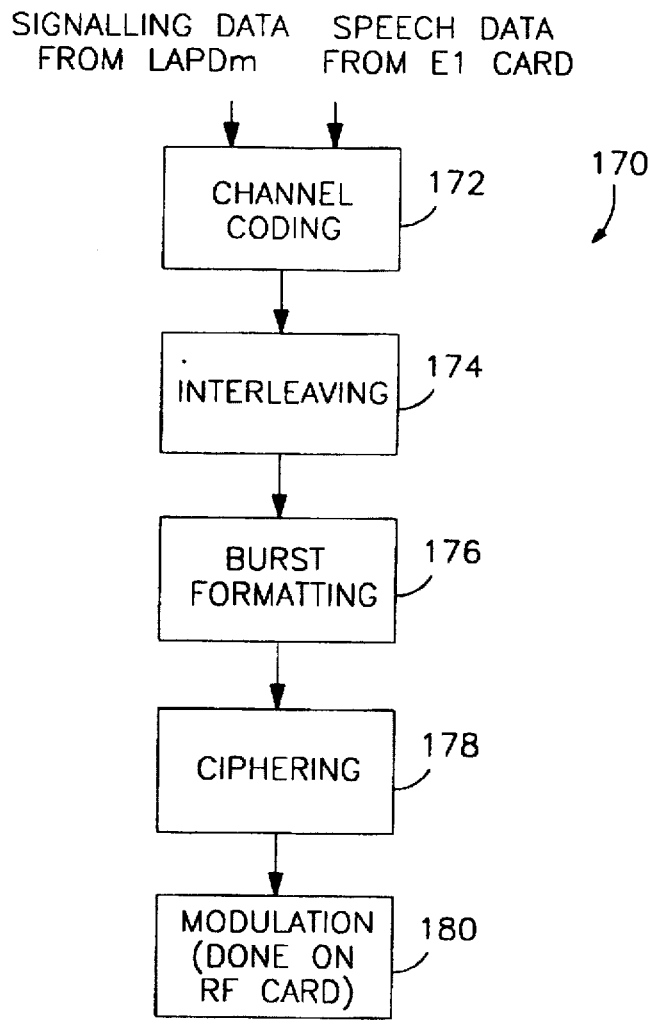
FIG. 11 is a flow chart showing steps performed by the signal processor of FIG. 10.

In another embodiment depicted in FIGS. 10 and 11, the signal processing architecture is provided to increase the throughput and task-based allocation of processing resources. A first aspect of this embodiment is shown in FIG. 10A, where an array of 2 wide and 1 deep DSPs are configured. A second aspect of this embodiment is shown in FIG. 10B, where an N by M array of DSPs are configured. In essence, FIG. 10A is FIG. 10B where N=2 and M=1.

This embodiment shows how an array of signal processors 84 is arranged to process outbound information in parallel and in series. Parallel digital signal processors 1A-NA, 2A-NA, 1M-NM simultaneously process outbound information correlated with each of the TDMA time slots while the series digital signal processors 1A-1M, 2A-2M, NA-NM sequentially process information in each of the respective TDMA time slots in efficient pipeline processing. Then, multiplexer 46 distributes the information to transmitter 40. This procedures is further explained with reference to FIG. 11.

The flow chart of FIG. 11 shows steps performed by string 1 of the signal processor of FIG. 10A to process the outbound information. Central processor 82 obtains outbound information to be transmitted to the mobile stations 12. The outbound information is processed and prepared for delivery to the signal processing array 84. DSP array 84 may also receive speech traffic from a space/time switch included is processor 82 that routes traffic to and from an information link (e.g., E1 link) or other processors. Step 172 is performed to encode the data so that the mobile station 12 can properly detect errors and correct the data for errors when possible. This is performed in DSP1A. Next, step 174 interleaves the data to distribute the outbound information over several TDMA frames. This is performed in DSP1A. Thereafter, step 176 burst formats the information in order to construct the correct data pattern for the mobile station 12. This is performed in DSP1A. A ciphering step 178 is performed in DSP1A to encrypt the outbound information to prevent interception by unauthorized mobile stations. When a two deep (N=2) aspect of this embodiment is employed, step 178 is performed in DSP1B. Then the outbound information is delivered to multiplexer 46 and sent to the transmitter 40 to be transmitted to the mobile stations 12.

The same sequential steps shown in FIG. 11 are also performed on a different timeslot in second string DSP2A and DSP2B shown in FIG. 10A. The same sequential steps of FIG. 11 may also be performed in any array size in parallel strings DSPNA-DSPNM shown in FIG. 10B. Moreover, the steps shown in FIG. 11 can be distributed to even more DSPs in a string if M is chosen greater than 2.

Figure 12A:
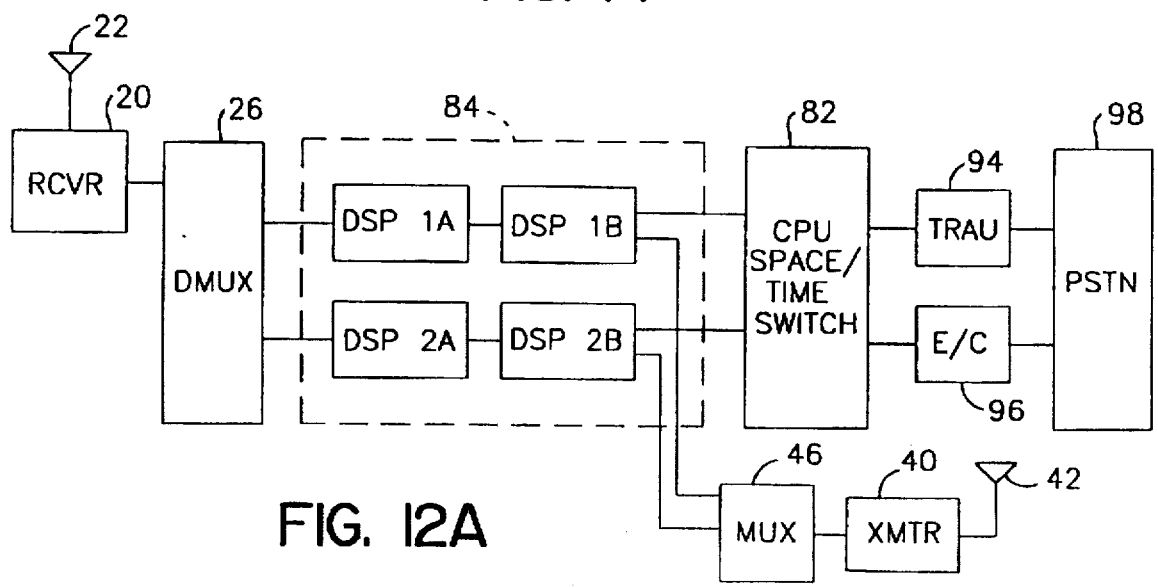
FIGS. 12A–B depict another embodiment of a signal processor architecture according to the invention.
Figure 12B:
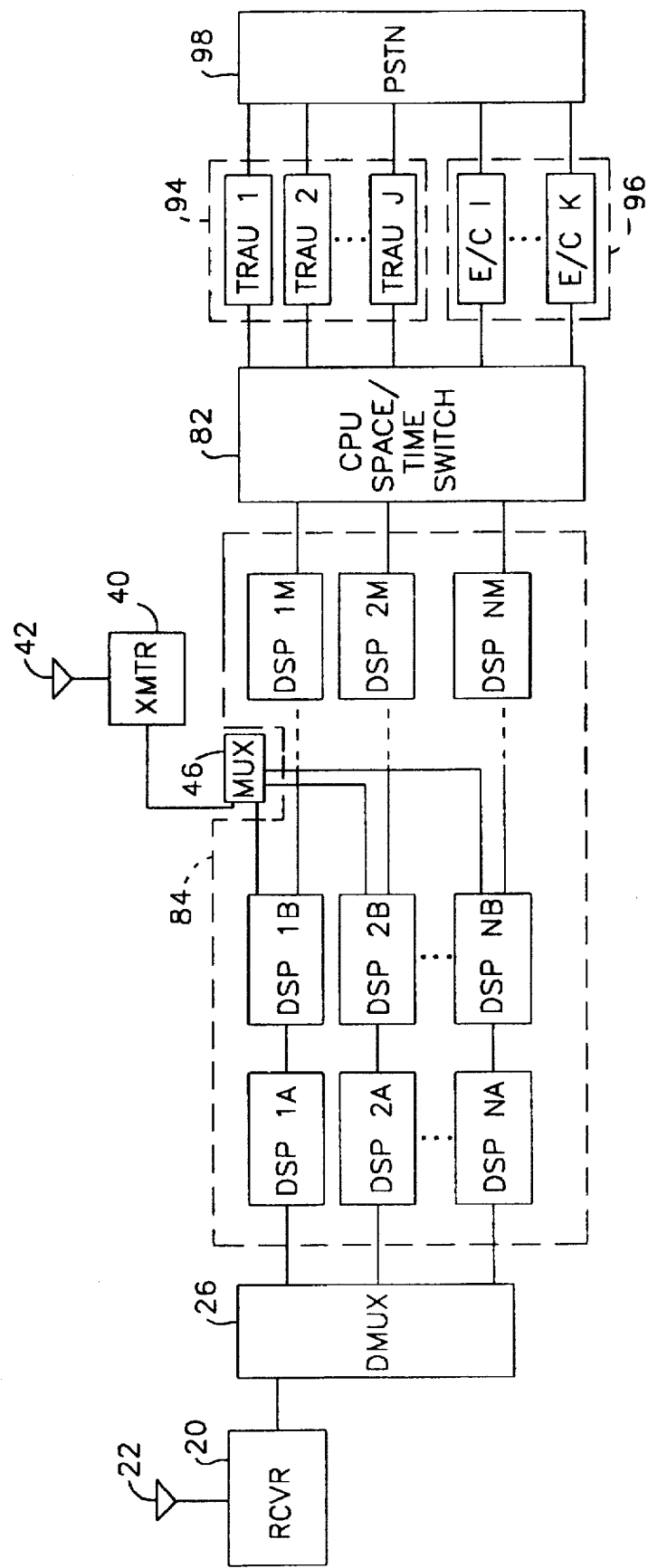

FIG. 12 depicts another embodiment of a signal processor architecture according to the invention. A first aspect of this embodiment is shown in FIG. 12A, where an array of 2 wide and 2 deep DSPs are configured. A second aspect of this embodiment is shown in FIG. 12B, where an N by M array of DSPs are configured. In essence, FIG. 12A is FIG. 12B where N=2 and M=2. Separate receive antenna 22 and transmit antenna 42 are shown in FIG. 12, but they could be combined into a common antenna 21 as shown in FIG. 5.

In this embodiment, the inbound processing functions and the outbound processing functions are combined in signal processing array 84. This configuration employs the processing steps described with respect to FIGS. 9 and 11. One advantage to this architecture is that the duty cycles of the Various DSP elements are well balanced. This feature promotes efficient processing.

For example, in the receive only processing of FIG. 7A, the DSP1A element have a high duty cycle because the initial processing (equalization) is intensive. However, the DSP1B element has a lower duty cycle because the subsequent processing (decoding) is less intensive. In this embodiment shown in FIG. 12A, the outbound information processing (encoding) is combined with the inbound information processing (decoding) to efficiently increase the duty cycle of the DSP1B element. An approximate measure of computational intensity is that the equalization is twice as intensive as the decoding. Hence, in a two deep array, if the inbound equalization is performed in DSP1A, and the inbound decoding and outbound encoding is performed in DSP1B, then both DSPs are equally loaded. Moreover, this processing allocation is also efficient because the outbound encoding employs similar, or reciprocal, processing steps as the inbound decoding, but often in reverse. Thus, much of the program memory and lookup tables are the same.

DSP1B keeps track of which information it is processing so that the inbound information is sent to processor 82 (or DSP1M in FIG. 12B) and the outbound information is sent to the multiplexer 46. The processing of DSP2A and DSP2B are similarly allocated, as are DSPNA and DSPNB. Moreover, if the processing is further distributed in the array 84 of FIG. 12B, the processing allocation is distributed within all the parallel processing pipelines DSP1A-DSP1M through DSPNA-DSPNM.

Note that this embodiment also shows CPU 82 with a space/time switch for routing information to and from a plurality of transcoder rate adapting units 94, echo cancelers 96, and public switched telephone network 98. This configuration permits the processor 80 to control the entire operation of the inbound information and outbound information.

Note also that the described control functions of CPU 82 can be distributed among several processors. In one implementation, CPU 82 includes several subordinate microcontrollers resident with the DSPs or with the space/time switch, all linked to and reporting to a central processor.

In actual implementation, it is useful to employ a plurality of receivers and transmitters in order to perform both TDMA and FDMA, as provided by the GSM specification. For example, in a conventional configuration, each receiver is tuned to a fixed frequency and frequency-hopped information from the mobile stations is received and transmitted by various receivers depending on the specified communication frequency. Then the conventional processor must re-assemble inbound information from a plurality of receivers to obtain data from one mobile station. Moreover, the conventional processor must dis-assemble outbound information and deliver it to a plurality of transmitters to properly transmit information to a mobile station.

Figure 13:
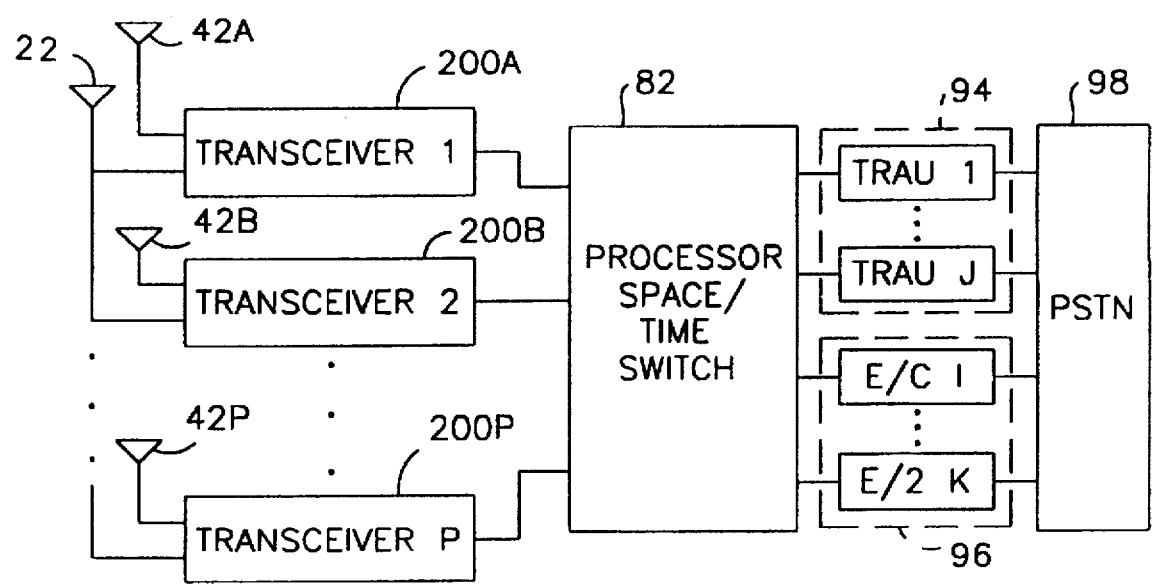
FIG. 13 depicts another embodiment of a signal processor architecture according to the invention.

FIG. 13 depicts another embodiment of a base station 10 according to the invention. There are provided a plurality of transceivers 200A-P that are frequency agile (as shown in FIG. 5). Hence, transceivers 200A-P can be programmed to receive various frequencies over time and can receive information from each mobile station 12 on a respective one of transceivers 200A-P. This feature permits both TDMA received signals and FDMA received signals associated with one mobile station 12 to be received by one of the transceivers 200A-P. Because processor 80 programs the receiver synthesizers, processor 80 has a priori knowledge of which transceiver 200A-P is receiving communication signals from which mobile station 12. This information permits the processor to more efficiently process the inbound data. For example, if the signal from one mobile station 12 is always received in transceiver card one 200A, then the processor 80 can reduce its control logic (hardware, software, or both) to avoid the conventional step of reassembling a mobile station's data from a number of different receivers. Also, configuring a plurality of frequency agile transceivers 200A-P in parallel permits processor 80 to reconfigure transceivers 200A-P at any time a fault is detected. If, for example, processor 80 detects a fault in transceiver 200A (e.g., by self-test, null data, or corrupted data), processor 80 re-programs another transceiver, such as transceiver 200P, to operate on the parameters that were previously assigned to transceiver 200A. The feature of agile transceivers and enhanced processing resource allocation reduces overhead, permits fault tolerance, and increases throughput since it eliminates a processing step. Moreover, the features discussed with respect to receiving information from the mobile stations 12 is equally applicable to transmitting outbound information to the mobile stations 12 via transceivers 200A-P.

As shown, transceivers 200A-P can be coupled to a common transmit antenna 42. However, if transceivers 200A-P are sensitive to back propagation of each other's transmissions, a plurality of transmit antennas (42A-P) can be employed with each transceiver having its own transmit antenna. Moreover, separate receive antennas 22A-P and transmit antennas 42A-P are shown in FIG. 13, but they could be combined into a common antennas 21A-P as shown in FIG. 5.

Additional base station embodiments are described in CELLULAR BASE STATION WITH INTELLIGENT CALL ROUTING, U.S. Ser. No. 08/434,598, filed on May 4, 1995, which is incorporated herein by reference.

Advantages of the present invention include reduced interference, improved communication bandwidth, fault tolerance, modularity, scalability, and more efficient and cost-effective base stations and mobile stations.

An additional advantage of the embodiment shown in FIG. 13 is that the transceivers 200A-P can be removed from or inserted into an operational station 12. This permits a technician to remove a broken transceiver and insert a new transceiver while the base station remains operational. The broken transceiver card can then be repaired and returned to service when needed.

As used herein, when a first element and a second element are coupled, they are related to one another, but need not have a direct path to one another. For example, a signal processing element may be coupled to a receiver element via a demultiplexer. However, when a first element and second element are connected, they are required to have a direct path to one another.

ALTERNATIVE EMBODIMENTS

Having disclosed exemplary embodiments and the best mode, modifications and variations may be made to the disclosed embodiments while remaining within the scope of the present invention as defined by the following claims.

What is claimed is:

1. A base station for communicating with a first mobile station and a second mobile station, and wherein inbound information includes a first time slot associated with the first mobile station and a second time slot associated with the second mobile station, and outbound information includes a first time slot associated with the first mobile station and a second time slot associated with the second mobile station, said base station comprising:

a receiver configured to receive inbound information from the first mobile station and the second mobile station;

demultiplexer coupled to said receiver and configured to route said inbound information associated with the first time slot to a first output and said inbound information associated with the second time slot to a second output;

a first signal processor coupled to said first output and configured to equalize said inbound information associated with the first time slot;

a second signal processor coupled to said first signal processor and configured to decode said inbound information associated with the first time slot;

a third signal processor coupled to said second output and configured to equalize said inbound information associated with the second time slot;

a fourth signal processor coupled to said third signal processor and configured to decode said inbound information associated with the second time slot;

a central processor coupled to said second signal processor and said fourth signal processor and configured to process said inbound information and to communicate said inbound information with a public switched telephone network, said central processor further configured to communicate outbound information with the public switched telephone network and to process said outbound information; and wherein:

said second signal processor is configured to encode said outbound information associated with said first time slot; and said fourth signal processor is configured to encode said outbound information associated with said second time slot; and said base station further comprises:

a multiplexer coupled to said second signal processor and said fourth signal processor and configured to route said outbound information associated with the first time slot to a multiplexer output and to route said outbound information associated with the second time slot to said multiplexer output; and a transmitter coupled to mid multiplexer output and configured to transmit said outbound information to the first mobile station and the second mobile station.

2. A base station for communicating with a first mobile station and a second mobile station, and wherein inbound information includes a first time slot associated with the first mobile station and a second time slot associated with the second mobile station, and outbound information includes a first time slot associated with the first mobile station and a second time slot associated with the second mobile station, said base station comprising:

a receiver configured to receive inbound information from the first mobile station and the second mobile station;

demultiplexer coupled to said receiver and configured to route said inbound information associated with the first time slot to a first output and said inbound information associated with the second time slot to a second output;

a first signal processor coupled to said first output and configured to equalize said inbound information associated with the first time slot;

a second signal processor coupled to said first signal processor and configured to decode said inbound information associated with the first time slot;

a third signal processor coupled to said second output and configured to equalize said inbound information associated with the second time slot;

a fourth signal processor coupled to said third signal processor and configured to decode said inbound information associated with the second time slot;

a central processor coupled to said second signal processor and said fourth signal processor and configured to process said inbound information and to communicate said inbound information with a public switched telephone network, said central processor further configured to communicate outbound information with the public switched telephone network and to process said outbound information; and wherein:

said second signal processor is configured to encode said outbound information associated with said first time slot;

said first signal processor is configured to encrypt said outbound information associated with said first time slot;

said fourth signal processor is configured to encode said outbound information associated with said second time slot; and said third signal processor is configured to encrypt said outbound information associated with said first time slot; and said base station further comprises:

a multiplexer coupled to said first signal processor and said third signal processor and configured to route said outbound information associated with the first time slot to a multiplexer output and to route said outbound information associated with the second time slot to said multiplexer output; and a transmitter coupled to said multiplexer output and configured to transmit said outbound information to the first mobile station and the second mobile station.

3. A base station for communicating over a cellular network with a first mobile station and a second mobile station, and wherein inbound information includes a first time slot associated with the first mobile station and a second time slot associated with the second mobile station, and outbound information includes a first time slot associated with the first mobile station and a second time slot associated with the second mobile station, said base station comprising:

a receiver configured to receive inbound information from the first mobile station and the second mobile station;

demultiplexer coupled to said receiver and configured to route said inbound information associated with the first time slot to a first output and said inbound information associated with the second time slot to a second output;

a first signal processor coupled to said first output and configured to equalize said inbound information associated with the first time slot;

a second signal processor coupled to said first signal processor and configured to decode said inbound information associated with the first time slot;

a third signal processor coupled to said second output and configured to equalize said inbound information associated with the second time slot;

a fourth signal processor coupled to said third signal processor and configured to decode said inbound information associated with the second time slot;

a central processor coupled to said second signal processor and said fourth signal processor and configured to process said inbound information and to communicate said inbound information with a public switched telephone network, said central processor further configured to communicate outbound information with the public switched telephone network and to process said outbound information;

a fifth signal processor coupled to said central processor and configured to encode said outbound information associated with said first time slot;

a sixth signal processor coupled to said central processor and configured to encode said outbound information associated with said second time slot;

a multiplexer coupled to said fifth signal processor and said sixth signal processor and configured to route said outbound information associated with the first time slot to a multiplexer output and to route said outbound information associated with the second time slot to said multiplexer output; and a transmitter coupled to said multiplexer output and configured to transmit said outbound information to the first mobile station and the second mobile station.

4. A base station for communicating over a cellular network with a first mobile station and a second mobile station, and wherein outbound information includes a first time slot associated with the first mobile station and a second time slot associated with the second mobile station, said base station comprising:

a central processor coupled to a public switched telephone network and configured to communicate outbound information with the public switched telephone network and to process said outbound information;

a first signal processor coupled to said central processor and configured to encode said outbound information associated with said first time slot;

a second signal processor coupled to said central processor and configured to encode said outbound information associated with said second time slot;

a multiplexer coupled to said first signal processor and said second sisal processor and configured to route said outbound information associated with said first time slot to a multiplexer output and to route said outbound information associated with said second time slot to said multiplexer output; and a transmitter coupled to said multiplexer output and configured to transmit said outbound information to the first mobile station and the second mobile station.

5. A base station for communicating over a cellular network with a first mobile station and a second mobile station, and wherein outbound information includes a first time slot associated with the first mobile station and a second time slot associated with the second mobile station, said base station comprising:

a central processor coupled to a public switched telephone network and configured to communicate outbound information with the public switched telephone network and to process said outbound information;

a first signal processor coupled to said central processor and configured to encode said outbound information associated with said first time slot;

a second signal processor coupled to said first signal processor and configured to encrypt said outbound information associated with said first time slot;

a third signal processor coupled to said central processor and configured to encode said outbound information associated with said second time slot;

a fourth signal processor coupled to said first signal processor and configured to encrypt said outbound information associated with said second time slot;

a multiplexer coupled to said second signal processor and said fourth signal processor and configured to route said outbound information associated with the first time slot to a multiplexer output and to route said outbound information associated with the second time slot to said multiplexer output; and a transmitter coupled to said multiplexer output and configured to transmit said outbound information to the first mobile station and the second mobile station.

6. A base station for communicating over a cellular network with a plurality of mobile stations, comprising:

a central processor;

a plurality of transceivers coupled to said central processor and configured to receive inbound information from the mobile stations and to transmit outbound information to the mobile stations; and wherein each of said transceivers includes a demultiplexer coupled to a receiver and to an array of signal processors having at least two parallel processing paths for equalizing and decoding the inbound signal and for encoding the outbound signal, said demultiplexer configured to route said inbound information to said array, and a multiplexer coupled to said array and to a transmitter, said multiplexer configured to route said outbound information to said transmitter.

7. A method of processing inbound information transmitted from a first mobile station and a second mobile station and received at a base station having a transceiver, a demultiplexer, a first signal processor, a second signal processor, a third signal processor, a fourth signal processor, a central processor and a multiplexer, and processing outbound information from a public switched telephone network via the base station, destined for the first mobile station and the second mobile station, wherein the inbound information includes a first time slot associated with the first mobile station and a second time slot associated with the second mobile station, and the outbound information includes a first time slot associated with the first mobile station and a second time slot associated with the second mobile station, said method comprising the steps of:

receiving the inbound information in the transceiver;

dividing the inbound information into the inbound information associated with the first time slot and the inbound information associated with the second time slot in the demultiplexer and delivering the inbound information associated with the first time slot to the first signal processor and the inbound information associated with the second time slot to the third signal processor;

equalizing the inbound information associated with the first time slot in the first signal processor;

decoding the inbound information associated with the first time slot in the second signal processor;

equalizing the inbound information associated with the second time slot in the third signal processor;

decoding the inbound information associated with the second time slot in the fourth signal processor;

processing the inbound information in the central processor in preparation for presenting the inbound information to a public telephone switched network;

receiving the outbound information in the central processor and delivering outbound information associated with the first time slot to the second signal processor and outbound information associated with the second time slot to the fourth signal processor;

encoding the outbound information associated with the first time slot in the second signal processor;

encoding the outbound information associated with the second time slot in the fourth signal processor;

combining the outbound information associated with the first time slot and the outbound information associated with the second time slot in the multiplexer and delivering the outbound information to the transmitter; and transmitting the outbound information in the transceiver.

8. The method of claim 7, further comprising the steps of:

encrypting the outbound information associated with the first time slot in the first signal processor; and encrypting the outbound information associated with the second time slot in the third signal processor.

9. A method of processing outbound information from a public switched telephone network in a base station having a transceiver, a first signal processor, a second signal processor, a central processor, and a multiplexer, the outbound information destined for a first mobile station and a second mobile station, said method comprising the steps of:

receiving the outbound information in the central processor, where the outbound information includes a first time slot associated with the first mobile station and a second time slot associated with the second mobile station and delivering outbound information associated with the first time slot to the first signal processor and outbound information associated with the second time slot to the second signal processor;

encoding the outbound information associated with the first time slot in the first signal processor;

encoding the outbound information associated with the second time slot in the second signal processor; and transmitting the outbound information in the transceiver.

10. The method of claim 9, wherein the base station further has a third signal processor and a fourth signal processor, said method further comprising the steps of:

encrypting the outbound information associated with the first time slot in the third signal processor;

encrypting the outbound information associated with the second time slot in the fourth signal processor.

* * * * *